Sept. 6, 1938.  J. MARETA  2,128,952
SEASONING POULTRY
Filed Feb. 1, 1936
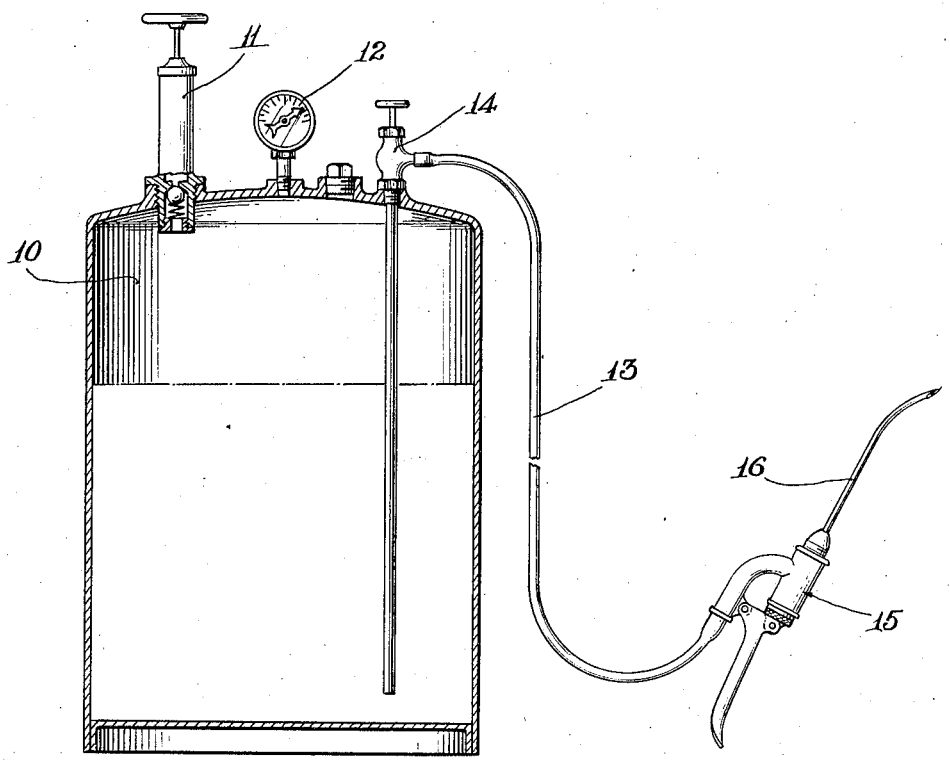
Inventor
Joseph Mareta
BY
Wm O. Belt
Attorney.

Patented Sept. 6, 1938

2,128,952

UNITED STATES PATENT OFFICE 2,128,952

SEASONING POULTRY

Joseph Mareta, Marseilles, Ill.

Application February 1, 1936, Serial No. 61,888

1 Claim. (Cl. 99—107)

This invention relates to seasoning poultry and its object is to provide a novel method and apparatus for seasoning a fowl when it is dressed so that the meat of the fowl will be permeated substantially throughout with the seasoning. The expression "seasoning" is to be understood as meaning flavoring or preparing in an appeal to taste, as distinguished from curing or preserving.

A further object of the invention is to avoid the necessity for seasoning a fowl as a part of the cooking operation and to inject liquid seasoning into the meat of the fowl when it is dressed to distribute the seasoning throughout the meat as distinguished from the ordinary method of seasoning by sprinkling the seasoning materials on the surface of the fowl.

Heretofore it has been the practice to season a fowl by sprinkling or rubbing the condiments on the fowl as a part of the operation of preparing the fowl for cooking. This method of seasoning is performed by hand, there is no control of the amount of condiments used and, while satisfactory results may be obtained, it is only by the exercise of great care and skill that this is possible, and generally speaking there would be a lack of uniformity in the seasoning of a number of fowls at different times. Furthermore, the hand method is principally a surface seasoning, although some of the seasoning may be cooked into the meat, and hence a fat chicken or turkey, for example, may have the skin well seasoned and some seasoning immediately beneath the skin but a substantial lack of seasoning within the meat below the surface. It is also customary to incorporate seasoning in the dressing with which the fowl is stuffed and some of this seasoning may be cooked into the fowl but with only such results as attend the outside surface seasoning.

I have discovered that if a liquid seasoning is injected into the meat of the fowl after it is dressed and before it is refrigerated or, indeed, becomes cold throughout, the seasoning will permeate the meat to all parts thereof and remain in the meat to season all the meat after the fowl is cooked. It is important to perform this operation immediately after the fowl is dressed and while it is still warm so that the liquid seasoning will permeate all the meat of the fowl. The injected liquid seasoning does not discolor the fowl but does have the effect of plumping the fowl and thereby improving its appearance when exhibited for sale and when it is prepared for cooking. It will be found also that the meat of the fowl which has been seasoned according to my method will be materially tenderized when cooked and served.

An apparatus for injecting the seasoning is shown in the accompanying drawing in which the figure is a sectional view.

The apparatus comprises a liquid tank 10, an air pump 11 supported on the tank, a pressure gauge 12, a hose 13, a shut-off valve 14, a hand valve 15, and an injection needle 16 connected to said valve. The tank having been partly filled with a supply of seasoning, the pump is operated until a desired pressure is obtained as indicated by the gauge. The shut-off valve is then opened and the apparatus is ready for use.

In injecting the seasoning in the fowl I prefer to make injections at a number of different parts of the fowl to assist in the distribution of the seasoning in the meat. For example, in a chicken I make injections in both sides of the breast, in both legs, in both wings and in two places on the back. It may be desirable to make more injections in a large fat fowl, such as a large turkey, than in a small lean fowl, as a small chicken, and the quantity of seasoning injected may be regulated by operating the valve to inject more or less seasoning as desired. If the fowl is still warm, as it should be, the injected seasoning will permeate the meat and the result will be that all or practically all of the meat of the fowl will be seasoned. The kind of liquid seasoning employed may be varied as desired to satisfy different conditions. A poultry dealer will select a kind and use a quantity of seasoning which will satisfy his particular trade and vary the kind and quantity as may be required. Such seasoning will, of course, conform to all food requirements and the injection of the seasoning will not in any respect deleteriously affect the food value of the fowl.

I claim:

The method of seasoning fowl, which consists in injecting a seasoning in liquid form into a plurality of places in the flesh of the fowl immediately after killing and before the body heat has left the fowl, whereby said liquid will become distributed throughout the fleshy parts of the fowl.

JOSEPH MARETA.